Vigo von Krogh Sundt
INVENTOR.

Patented Feb. 26, 1946

2,395,433

UNITED STATES PATENT OFFICE 2,395,433

APRON FEED CHANGE MECHANISM

Vigo von Krogh Sundt, Madison, Wis., assignor to Gisholt Machine Company, Madison, Wis., a corporation of Wisconsin Application December 7, 1942, Serial No. 468,142

2 Claims. (Cl. 74—337.5)

This invention relates to an apron feed change mechanism for feeding an apron on a machine tool at different rates of feed.

The principal object of the invention is to provide operation of both the gear shift mechanism and the coarse and fine feed clutches of the apron feed by a single rotary control member, to thereby facilitate ease of operation and control.

Another object is to employ a single locking means provided by the gear shift mechanism to lock the coarse and fine feed clutches in their respective positions.

Another object is to hold the coarse and fine feed clutches in operative position by means of a cam roller riding in a two-part concentric groove in the rotary control member so that there is no tendency for the clutch to become disengaged when in the desired operative position.

Another object is to provide a rotary cam control which employs a continuous cam groove that can be operated in either direction or continuously in one direction to reach a desired position.

Other objects of the invention will appear from the following description of an embodiment of the invention illustrated in the accompanying drawings.

Figure 1:
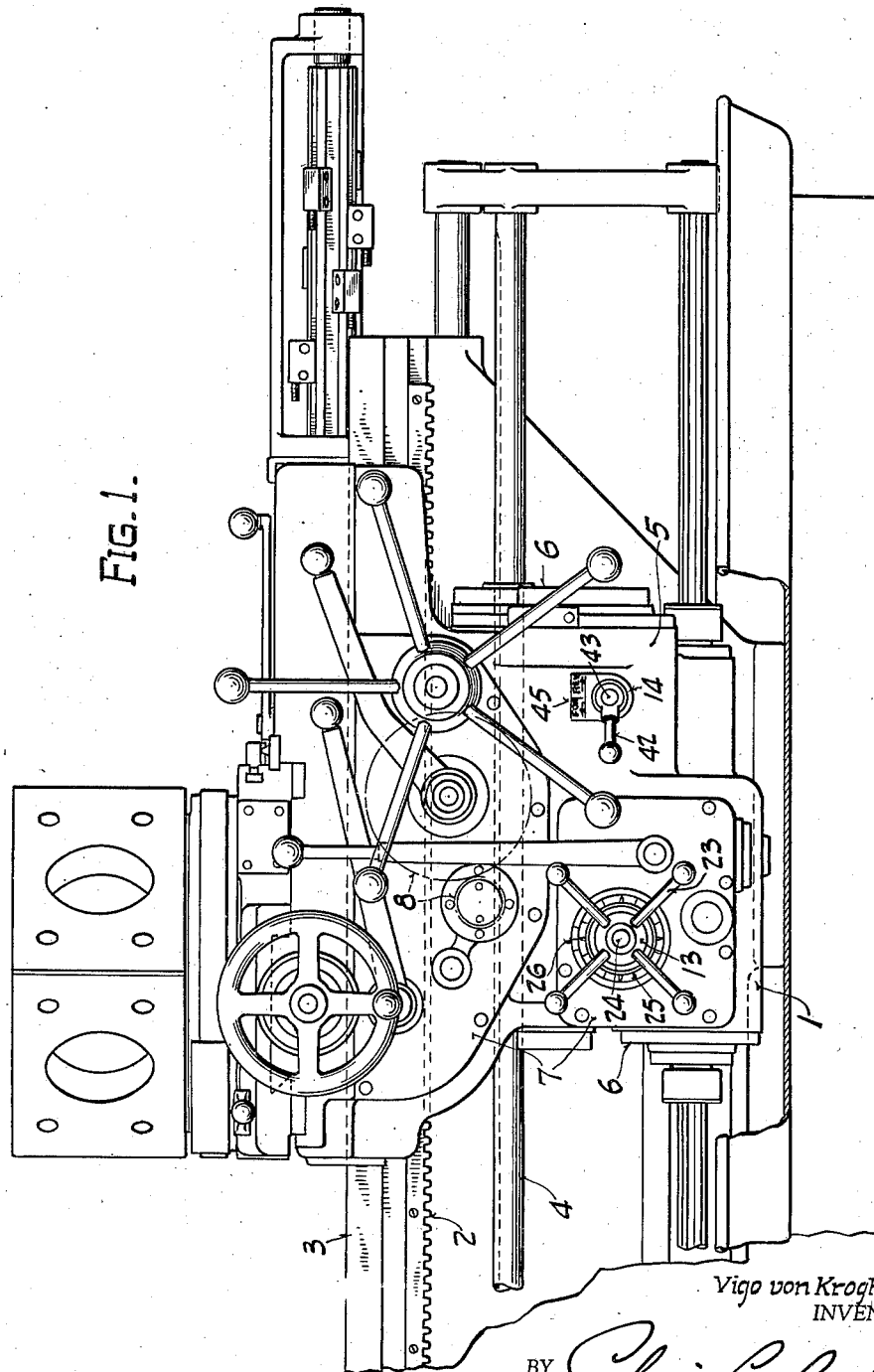
Figure 1 is a front elevation of a turret apron of a lathe.

The invention has been applied to the construction of lathes and, as illustrated in the drawings, the turret apron 1 is fed by means of the rack 2 extending longitudinally of the lathe 3. The rate of feed is determined by the speed of the gear on the apron that meshes with the rack 2.

The drive for the apron is provided by the drive shaft 4 which passes longitudinally through the apron, parallel to rack 2, and is rotated by the head stock of the lathe, when in operation.

The apron 1 generally comprises a housing 5 having end caps 6 and cover plates 7, to give access to the transmission mechanism housed within the apron. The apron housing 5 rides along the bed of the lathe 3 and carries a turret or other suitable tool post. The apron is geared to the rack 2 through a gear train 8 operated by a gear 9 keyed to the coarse and fine feed shaft 10 disposed inside the apron housing.

The speed of coarse and fine feed shaft 10 determines the feed of the apron along rack 2. Feed shaft 10 is driven by the drive shaft 4 at different rates of speed through a rate-changing and transmission mechanism disposed between the drive and feed shaft within the apron housing. This mechanism includes generally a feed gear shaft 11 and a forward and reverse shaft 12, together with their respective gears and clutches operating in conjunction with driving gears splined to shaft 4 and gears and clutches disposed on fine and coarse feed shaft 10.

A rotary control member 13, comprising a selector device disposed on the outside of the apron 1 and a cam arrangement on the inside of the apron, manipulates the gears and clutches of the rate-changing mechanism to control the speed of shaft 10 and thence through gears 9 and 8 the feed of the apron along rack 2. An additional selector device 14 is also disposed on the outside of the apron housing to provide the operator with means to drive the rate-changing mechanism in forward or reverse drive through the shaft 12 and its respective gears and clutches. By manipulating the rotary control member 13 eight different feeds can be obtained in the apron. The selector device 14 permits the eight feeds to operate the apron in either reverse or forward drive.

The gear-change transmission may be of any suitable type, that illustrated being of the cone-gear type with a ducking selector key for determining the speed of the output. For this purpose, a sleeve 15 is splined on shaft 4 and rotates in suitable bearings in the housing 5. The sleeve 15 moves along shaft 4 with the housing 5 during the feed of the apron. Cone gears 16, preferably four in number, are fixed to sleeve 15 and mesh with a similar set of cone gears 17 rotatably mounted on feed gear shaft 11. The cone gears 17 have a longitudinal key slot in the hub thereof separated by spacers 18 which provide retainers for the ducking key 19. The slide 20 of ducking key 19 is movable longitudinally in slot 21 in the shaft 11. A flanged slider collar 22 encircles the shaft 11 and slide 20 and is secured to the latter to operate the ducking key 19. The collar 22 is in turn operated by rotary control member 13.

The control member 13 comprises a pilot wheel 23 disposed on the outside of the apron and secured to pilot shaft 24 projecting through the cover plate 7. The hub of the pilot wheel carries a circular dial plate 25 having a series of numerals covering a range of speeds at which the apron may be driven. A feed plate 26 formed integrally with cover plate 7 is provided with a suitable pointer to designate the number on the dial plate 25 that corresponds to the feed in feet per minute at any given adjustment.

A gear 27 is secured to the inner end of pilot shaft 24 and meshes with gear 28 on cam 29. The cam, looking from left to right in Fig. 4 has a continuous cam groove 30 and a two-part concentric cam groove 31.

Cam roller 32 is disposed in cam groove 30 and the stud portion of the roller is secured to lever 33 with one end of the latter being pivotally fixed within bushing 34 secured to housing 5 and the other end carrying shoe 35 engaging between the flanges of key slider collar 22 of ducking key 19.

The ducking key 19 is moved by slider 22 into successive engagement with either of the four cone gears 17 by a half turn of cam 29 through manipulation of pilot wheel 23. Through another half turn of cam 29, ducking key 19 is again moved into successive engagement with cone gears 17 in reverse order. By the manipulation of the rotary control member 13 which includes pilot wheel 23 and the cam 29, it is possible to drive feed gear shaft 11 at four different feeds or speeds.

At the inner end of feed gear shaft 11 adjacent cone gears 17 is secured the forward drive gear 36 and at the outer end of the shaft 11 adjacent cone gears 17 is secured the reverse drive gear 37.

The forward drive gear 36 meshes with gear 38 rotatably mounted on the forward and reverse shaft 12, and reverse drive gear 37 through idler gear 39 drives gear 40 rotatably mounted on forward and reverse shaft 12.

A sliding clutch 41 is splined to forward and reverse shaft 12 and may be shifted by shifter element 14 in one direction to engage gear 38 to drive shaft 12 in forward rotation at the speed of feed gear shaft 11 or shifted in the opposite direction to engage gear 40 to drive shaft 12 in reverse rotation at the speed of feed gear shaft 11.

Figure 5:
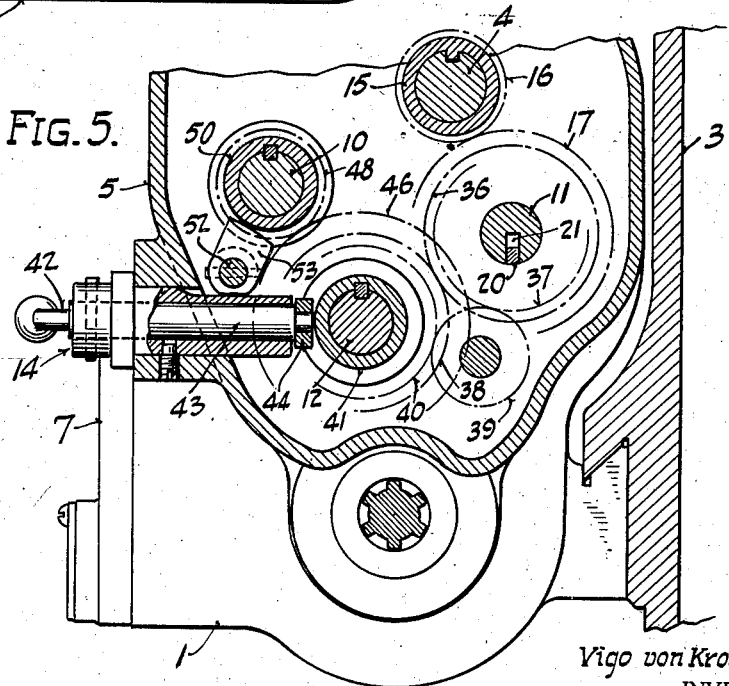
Fig. 5 is a detail section showing the forward and reverse shifting mechanism.

Shifter element 14 illustrated in Fig. 5 comprises a lever 42 disposed on the outside of the apron housing and secured to a shaft 43 projecting within the housing. A shoe 44 secured eccentrically to the inner end of shaft 43 engages the clutch member 41 splined to the forward and reverse shaft 12. Plate 45 is provided on the outside of apron 1 above lever 42 with forward and reverse indications thereon for use by the operator in operating the shifter lever.

A gear 46 is fixed to the inner end of forward and reverse shaft 12 adjacent gear 38 and the outer end of shaft 12 has a pinion 47 rotatable therewith. Gear 46 drives coarse feed pinion 48 rotatably mounted on coarse and fine feed shaft 10, and pinion 47 drives fine feed gear 49 rotatably mounted on coarse and fine feed shaft 10.

A sliding clutch 50 is splined to coarse and fine feed shaft 10 and may be shifted in one direction to engage the coarse feed pinion 48 to drive shaft 10 at the coarse feed speed or may be shifted in the opposite direction to engage fine feed gear 49 to drive shaft 10 by pinion 47 on shaft 12.

The sliding movement of clutch 50 in one direction or the other is obtained by manipulation of the pilot wheel 23. The cam 29, as previously described, is provided not only with cam groove 30 by means of which gears 17 are brought into driving engagement with shaft 11 but also with cam groove 31.

The two-part concentric cam groove 31 reciprocates sliding clutch 50 on coarse and fine feed shaft 10 by means of cam roller 51 disposed in the groove and rod 52 secured to roller 51 at one end and engaging clutch 50 at the other end through shoe 53.

While ducking key 19 is successively engaging different gears 17 through a half turn of cam 29 by manipulation of pilot wheel 23, clutch 50 is held in engagement with fine feed gear 49 giving a range of four feeds in a fine feed group. When ducking key 19 successively engages gears 17 in reverse order through another half turn of cam 29 by operation of pilot wheel 23, clutch 50 is held in engagement with coarse feed pinion 48 giving another range of four feeds in a coarse feed group. In this way, coarse and fine feed shaft 10 may be driven at eight different selected speeds.

The gear 9, previously described as secured to shaft 10, is therefore enabled to drive gear train 8 engaging rack 2 and gear 9 at eight different speeds to propel apron 1 longitudinally along rack 2 at eight different feeds. The apron 1 also may be driven in reverse motion along rack 2 at eight different feeds by movement of lever 42 of shifter element 14 to the reverse indication on plate 46 to shift clutch 41 into engagement with the reverse driving gear 40 on shaft 12.

Figure 2:
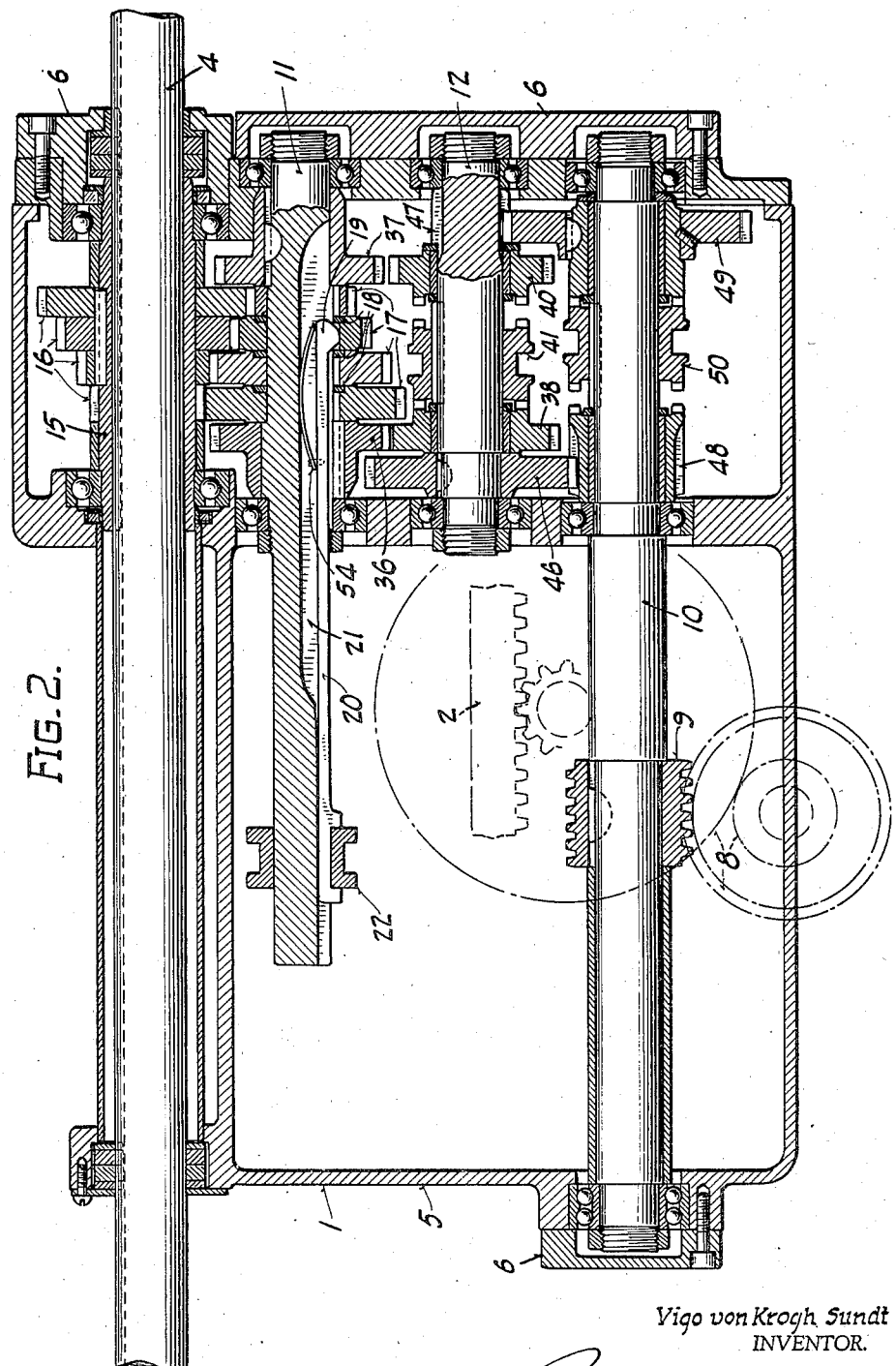
Fig. 2 is a longitudinal developed section illustrating the gear drive and clutches for the apron feed.
Figure 3:
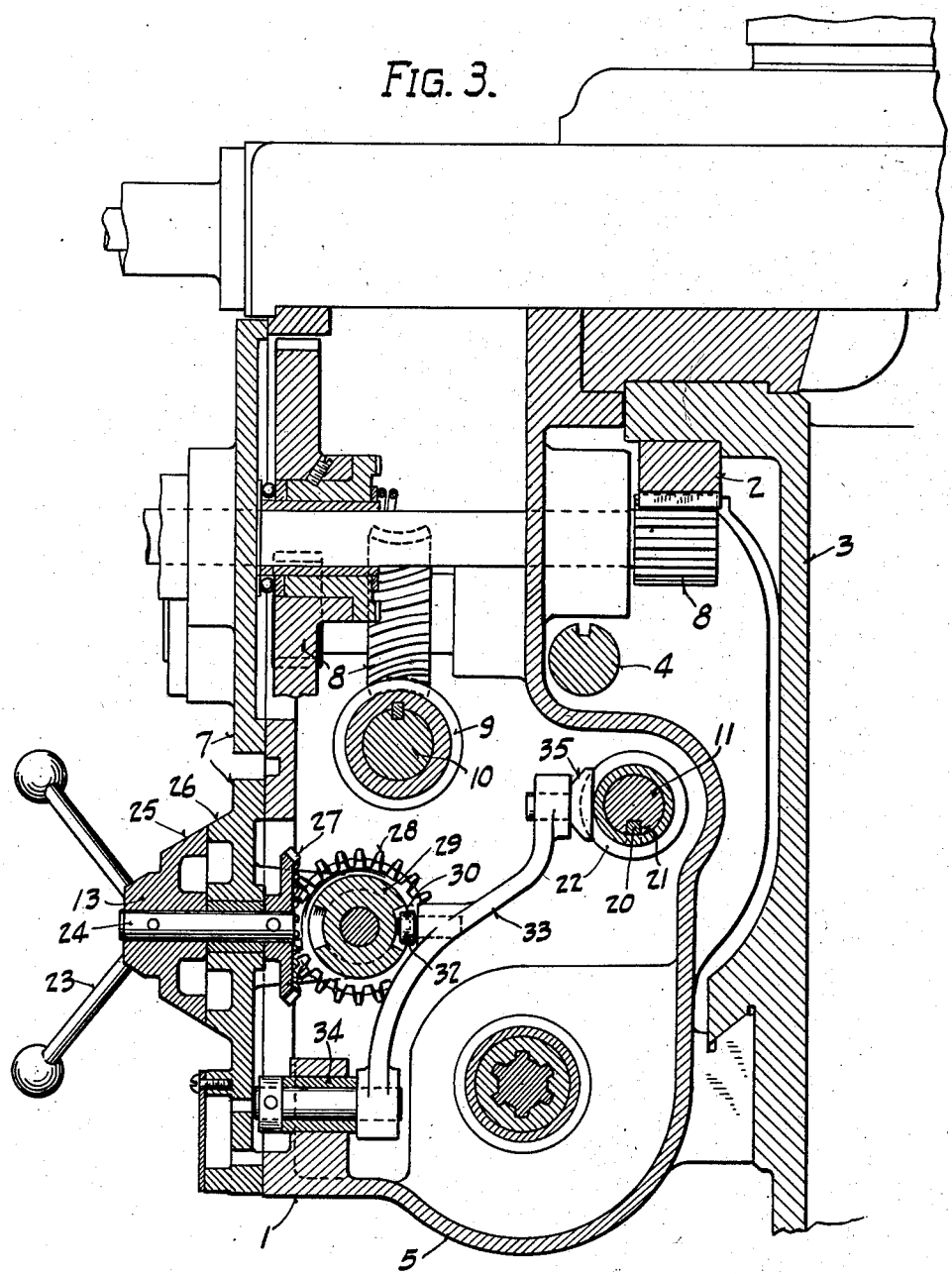
Fig. 3 is a transverse section of the control mechanism.
Figure 4:
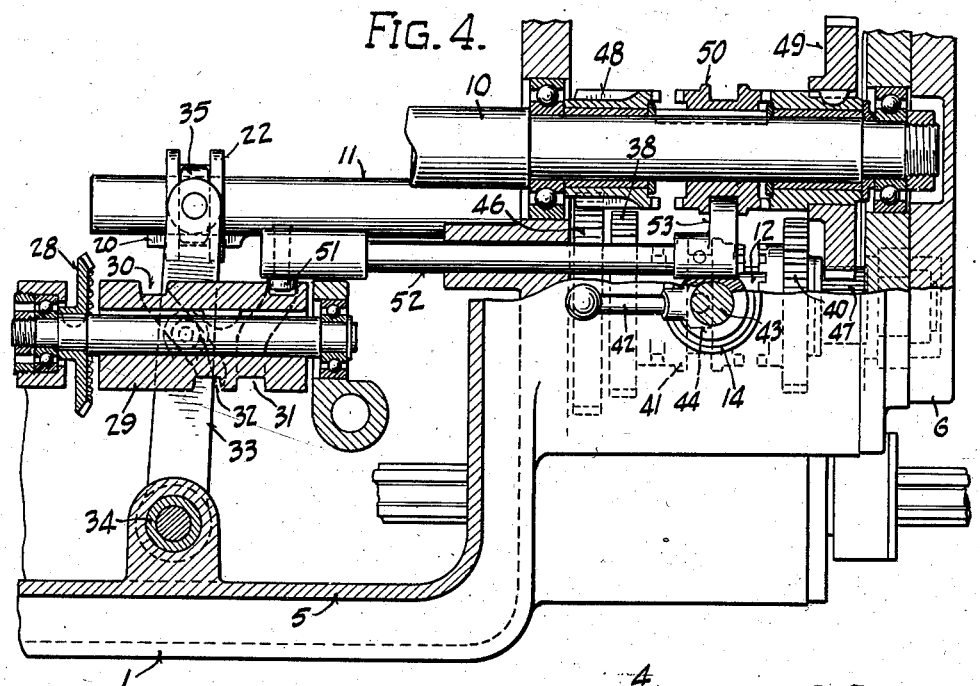
Fig. 4 is a longitudinal section of the control mechanism showing the operating cams for the feed change.

In the drawing illustrating the invention, ducking key 19 is in engagement with the second gear of cone gears 17, looking from right to left in Fig. 2, to drive feed gear shaft 11 through the second gear of cone gears 16 with which the described second gear of cone gears 17 meshes. The cam roller 32 with the ducking key 19 in the described engagement with one of the cone gears 17, is in a position representing substantially between one-eighth and one-quarter of the revolution of cam 29. Cam roller 51 is disposed in the right half portion of cam groove 31. With the roller in this position, the sliding clutch 50 is disposed in engagement with fine feed gear 49 as shown in Figs. 2 and 4.

Lever 42 of shifter element 14 is shown as resting at the forward drive indication which disposes clutch 41 in engagement with forward driving gear 38 on shaft 12.

With the various control members in the positions described and shown in the drawings, shaft 4 rotates the second gear of cone gears 16 to drive the second gear of gears 17, keyed to shaft 11 by ducking key 19. This rotates shaft 11 carrying the fixed gear 36 driving gear 38 disposed in clutch driving engagement with forward and reverse shaft 12 to effect rotation of the latter shaft in forward drive. The rotation of shaft 12 rotates pinion 47 fixed thereon. Pinion 47 drives fine feed gear 49 which is in clutch driving engagement with coarse and fine feed shaft 10 to drive shaft 10 from drive shaft 4 through the described gears and shafts. The speed of shaft 10 is communicated to rack 2 through gear 9 secured to the shaft and geared to gear train 8 in engagement with the rack to feed apron 1 along the rack at a certain defined rate of feed.

The rate of feed desired by the operator such as in feet per minute is indicated on dial plate 25 and is obtainable by manipulation of pilot wheel 23.

The securing of ducking key 19 in any one of its four positions by reason of the spring 55 backing the same and of the spacers 18 holding it from longitudinal movement, effectively holds slider 22 and lever 33 from moving and thereby prevents rotation of the cam 29 out of selected position. Since cam 29 is prevented from rotating except when rotated by pilot wheel 23, the coarse and fine feed clutch will be held in any given selected position by the cam 29. In this way the shift mechanism is held in selected position and can only be changed by manual operation of the pilot wheel 23.

The invention provides a plurality of separate and distinct feeds by manipulation of only a single control member.

Various embodiments of the invention may be employed within the scope of the accompanying claims.

I claim:

1. In a speed change mechanism, a set of cone gears, a ducking key selectively shiftable in one group of said cone gears to determine the gear ratio to be employed for the speed change mechanism, a floating clutch member, a plurality of gear trains selectively operable by said floating clutch member and superimposed in series with said set of cone gears, a control member comprising a single rotary element having a plurality of cam tracks with cam riders for simultaneously and individually controlling the shifting of said ducking key and clutch member to provide a plurality of selected gear ratios superimposed in series upon one another, the cam track for operating said ducking key being substantially spiral for one-half turn of the element and with a similar return track, and the cam track for operating said clutch member being of two semi-circumferential parts offset from one another and connected by diagonal sections to provide a continuous track, said parts being disposed to provide for holding the cam rider for said clutch member against longitudinal movement while the cam rider for said ducking key is in an intermediate position and for moving the cam rider for said clutch member from one part of its corresponding track to another while the cam rider for said ducking key is at an extreme longitudinal position, and means for holding said ducking key in any selected position of shift for said cone gears, said ducking key through its cam rider serving to prevent accidental rotation of said rotary element and displacement of said floating clutch member from its selected position.

2. In a speed change mechanism, a set of cone gears having a ducking key driving connection with a common shaft to provide for selective gear ratios, separate gear trains to be selectively superimposed upon said first named gear ratios, a floating clutch member for selecting said gear trains, and a single rotary element having a plurality of cam tracks with cam riders, one of which operates said ducking key to select a given gear ratio and another of which operates said floating clutch to select a given gear train, and means to retain said ducking key in any given selective operative position, said retaining means acting through said ducking key and its corresponding cam rider to prevent accidental rotation of said rotary element and consequent movement of said floating clutch member out of operative position when said ducking key is in operative position.

VIGO von KROGH SUNDT.